United States Patent
Faruque et al.

(10) Patent No.: US 10,501,041 B2
(45) Date of Patent: Dec. 10, 2019

(54) VEHICLE AIRBAG SYSTEM

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US); Mark A. Cuddihy, New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

(21) Appl. No.: 15/675,007

(22) Filed: Aug. 11, 2017

(65) Prior Publication Data

US 2019/0047503 A1     Feb. 14, 2019

(51) Int. Cl.
| | |
|---|---|
| *B60R 21/207* | (2006.01) |
| *B60R 21/00* | (2006.01) |
| *B60R 21/01* | (2006.01) |
| *B60R 21/02* | (2006.01) |
| *B60N 2/20* | (2006.01) |
| *B60R 21/217* | (2011.01) |
| *B60R 21/231* | (2011.01) |

(52) U.S. Cl.
CPC .............. *B60R 21/207* (2013.01); *B60N 2/20* (2013.01); *B60R 2021/0032* (2013.01); *B60R 2021/01211* (2013.01); *B60R 2021/0273* (2013.01); *B60R 2021/2173* (2013.01); *B60R 2021/23153* (2013.01)

(58) Field of Classification Search
CPC .. B60R 2021/23153; B60R 2021/0032; B60R 2021/01211; B60R 2021/0273; B60R 21/207; B60N 2/20

USPC ....................................................... 280/730.1
See application file for complete search history.

(56) References Cited

U.S. PATENT DOCUMENTS

| | | | | |
|---|---|---|---|---|
| 5,344,184 | A * | 9/1994 | Keeler ................. | B60R 21/045 280/730.1 |
| 5,466,001 | A | 11/1995 | Gotomyo et al. | |
| 6,945,557 | B2 * | 9/2005 | Takimoto .............. | B60R 21/206 280/730.1 |
| 7,380,821 | B2 * | 6/2008 | Higuchi ................ | B60N 2/427 280/743.1 |
| 7,874,576 | B2 | 1/2011 | Gandhi | |
| 9,296,353 | B1 * | 3/2016 | Choi ................. | B60R 21/01554 |

FOREIGN PATENT DOCUMENTS

| | | |
|---|---|---|
| JP | 7117600 A | 5/1995 |
| JP | 4176556 B2 | 8/2008 |
| KR | 20040095385 A | 11/2004 |
| WO | 200144026 A1 | 6/2001 |
| WO | 2016087009 A1 | 6/2016 |

* cited by examiner

*Primary Examiner* — Paul N Dickson
*Assistant Examiner* — Hilary L Johns
(74) *Attorney, Agent, or Firm* — Frank A. MacKenzie; Bejin Bieneman PLC

(57) ABSTRACT

An airbag system includes a seat back having a first location and a second location spaced from the first location. The airbag system includes a housing pivotally supported by the seat back at the first location. The airbag system includes a linear actuator including a first end and a second end opposite the first end. The first end is fixed to the seat back at the second location. The second end is fixed to the housing.

20 Claims, 10 Drawing Sheets

FIG. 5
FIG. 6
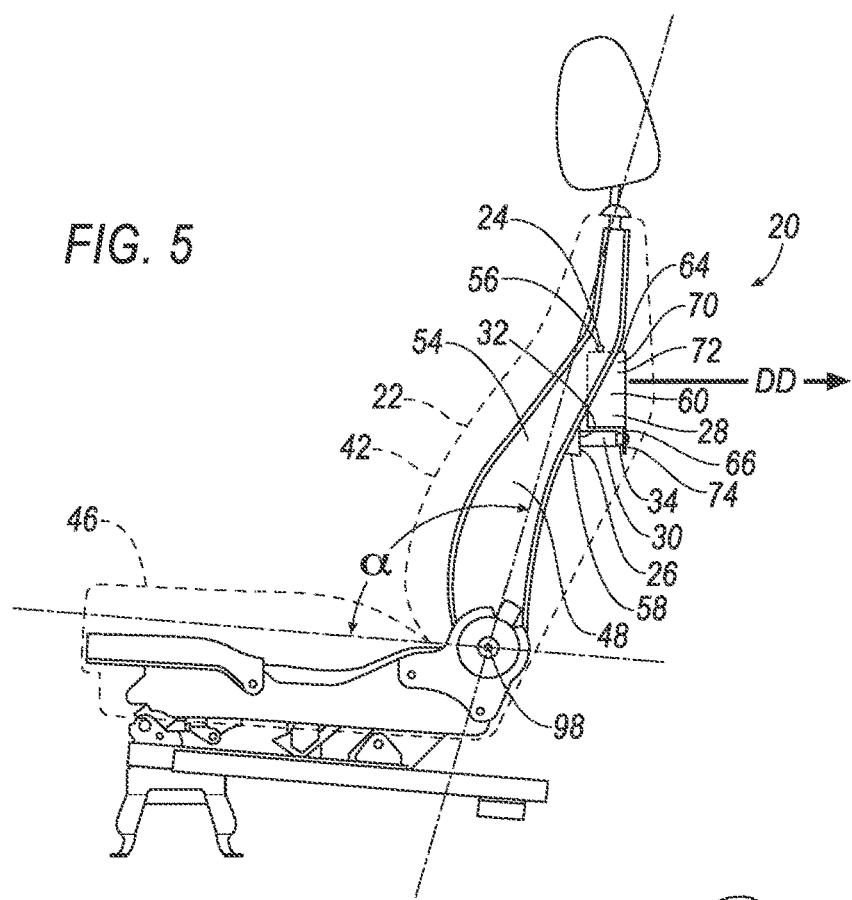
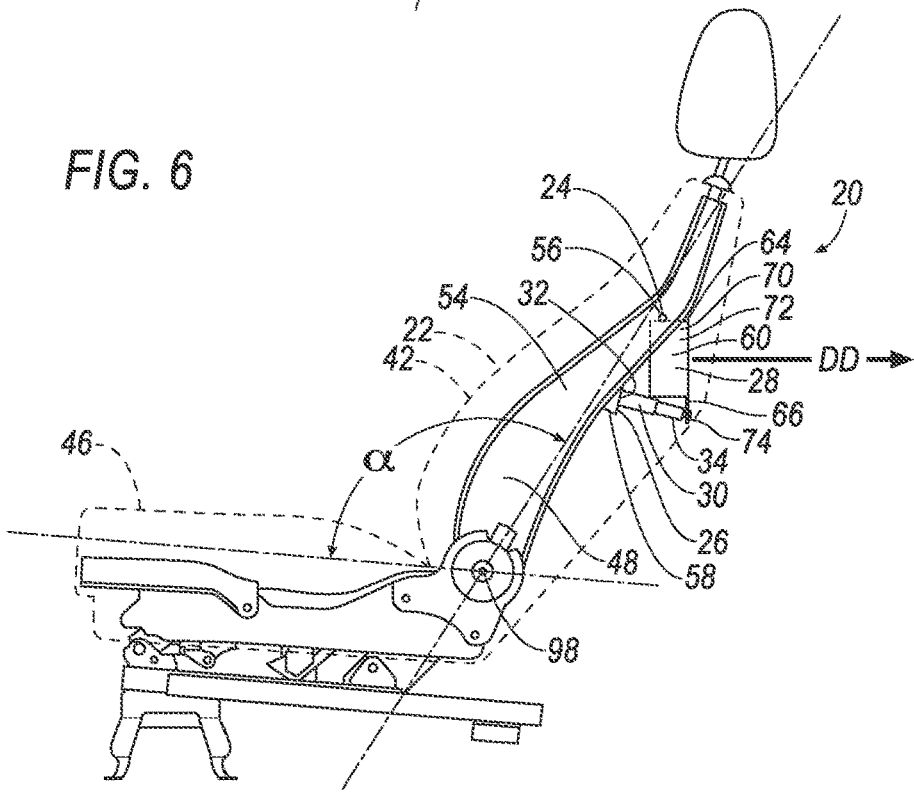

VEHICLE AIRBAG SYSTEM

BACKGROUND

Vehicles may include a variety of airbags deployable during vehicle impacts to absorb energy from occupants of the vehicles during the impact. The airbag may be a component of an airbag assembly including a housing supporting the airbag, and an inflation device in communication with the airbag for inflating the airbag from an uninflated position to an inflated position. The airbag assemblies may be supported on a steering wheel of the vehicle, an instrument panel of the vehicle, etc.

BRIEF DESCRIPTION OF THE DRAWINGS

FIG. 5 is a side view of a seat of the airbag system at a first seat angle.

FIG. 6 is a side view of the seat of the airbag system at a second seat angle.

DETAILED DESCRIPTION

Figure 1:
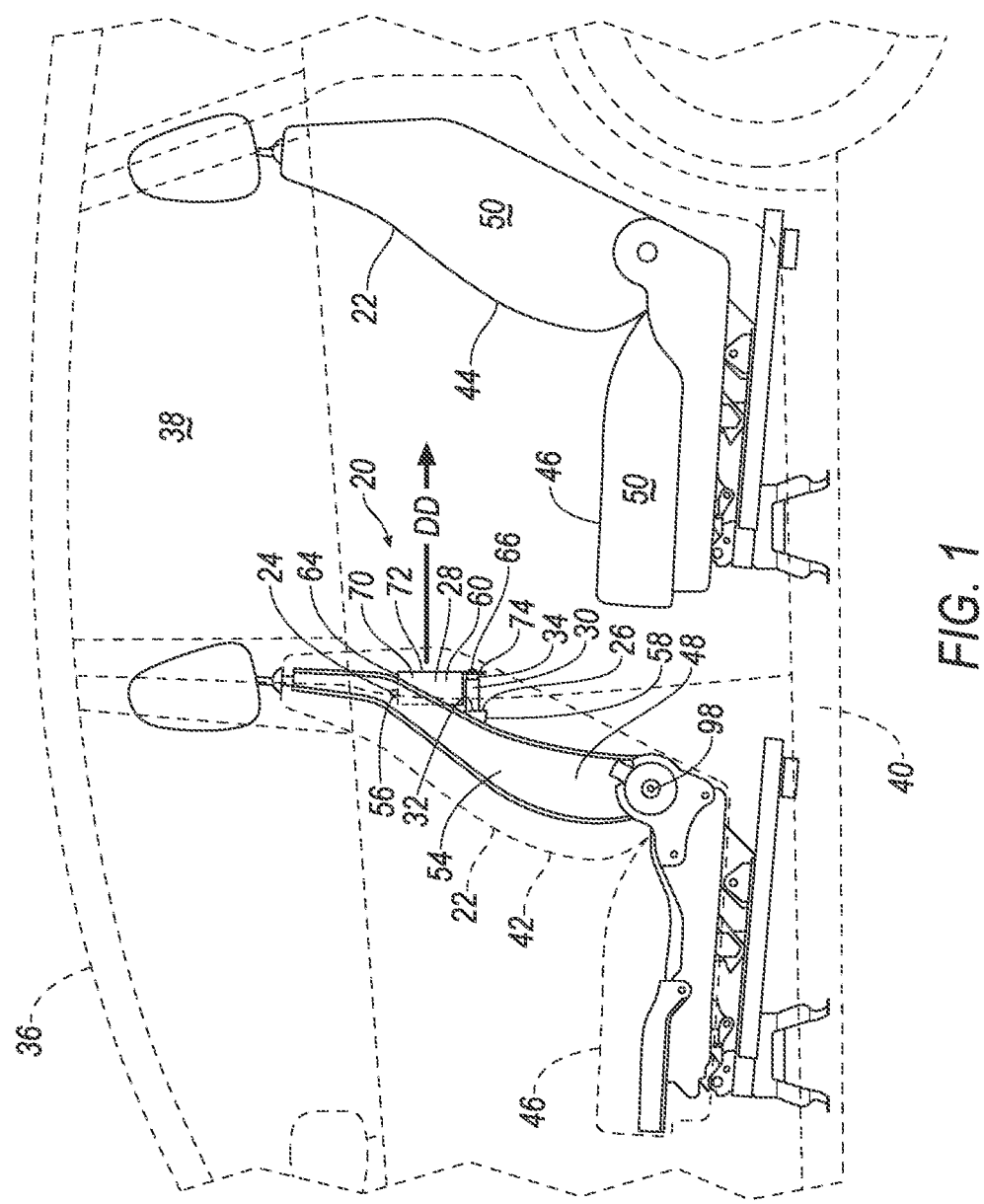
FIG. 1 is a side view of a vehicle including an airbag system with an airbag of the airbag system in an uninflated position.
Figure 2:
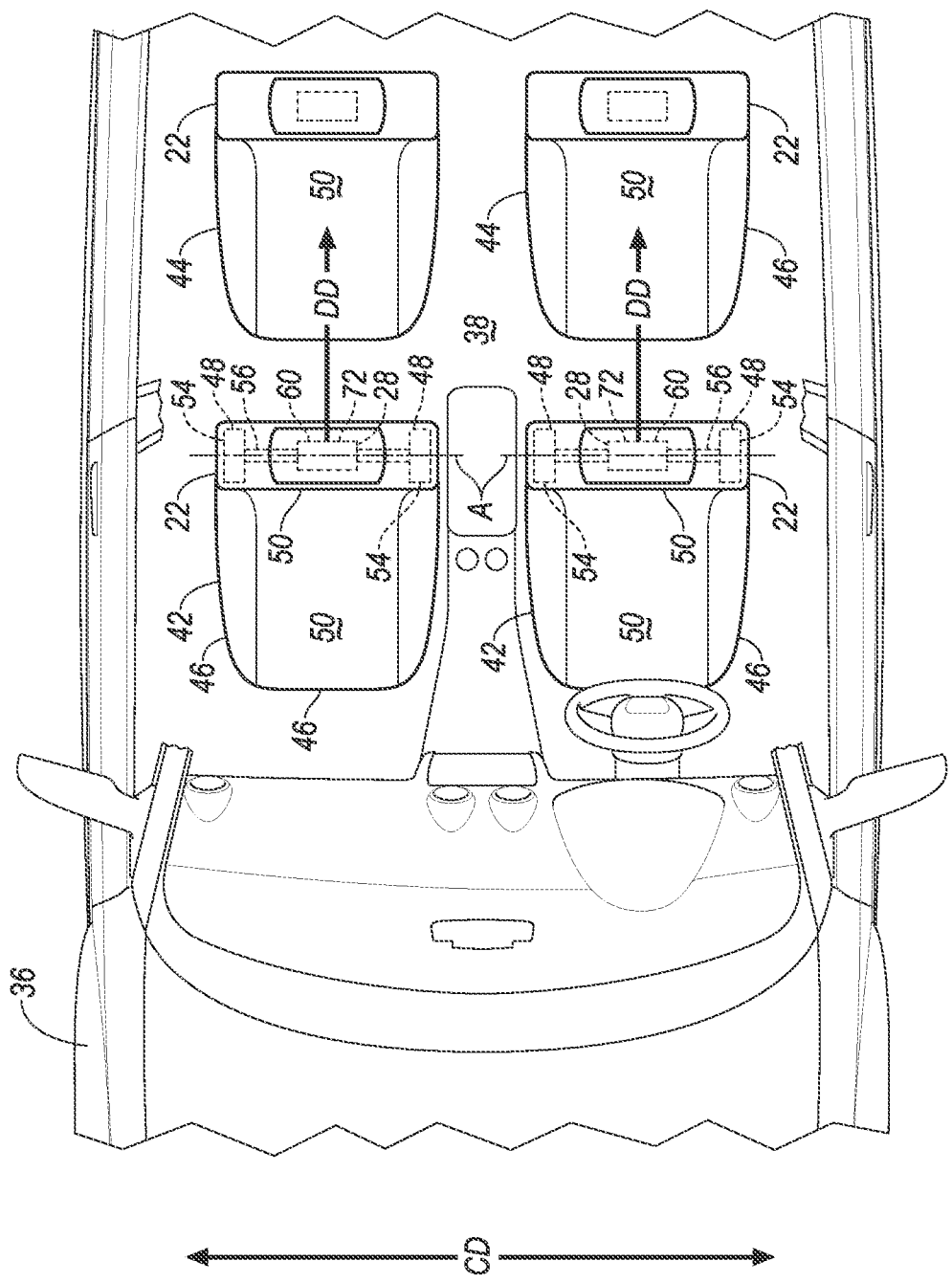
FIG. 2 is a top view of the vehicle including the airbag system with the airbag of the airbag system in the uninflated position.

An airbag system includes a seat back having a first location and a second location spaced from the first location. The airbag system includes a housing pivotally supported by the seat back at the first location. The airbag system includes a linear actuator including a first end and a second end opposite the first end, the first end fixed to the seat back at the second location, the second end fixed to the housing.

The housing may include a flange and the second end is fixed to flange.

The housing may include a main body and a hinge connecting the flange to the main body.

The housing may include a slot and the linear actuator may be slideably engaged with the slot.

The airbag system may include a cable connecting the second end of the linear actuator and the housing.

The housing may define an airbag deployment direction and the linear actuator may be operable to move the housing to change the airbag deployment direction.

The linear actuator may include a base immovably fixed to the seat back.

The linear actuator may be self-locking.

The linear actuator may include a base and an extending portion, the base may have a rotatable threaded shaft, the extending portion may have a threaded hole engaged with the threaded shaft.

The airbag system may include a computer programmed to detect a seat angle and to actuate the linear actuator based on the seat angle.

The airbag system may include a seat bottom, the seat bottom and the seat back may define the seat angle.

The seat back may include a frame pivotally supporting the housing and the first end may be fixed to the frame.

The housing may have a first end and a second end opposite the first end, the first location may be at the first end of the housing, and the second end of the linear actuator may be fixed to the second end of the housing.

The airbag system may include an airbag disposed within the housing and an inflator in communication with the airbag.

The linear actuator may be disposed beneath the housing.

A vehicle includes a seat back having a first location and a second location spaced from the first location. The vehicle includes a housing pivotally supported by the seat back at the first location. The vehicle includes a linear actuator including a first end and a second end opposite the first end, the first end fixed to the seat back at the second location, the second end fixed to the housing.

The vehicle may include a second seat back spaced from the seat back, the housing may define an airbag deployment direction that is toward the second seat back.

The vehicle may include a second seat back spaced from the seat back, the linear actuator may be operable to change an airbag deployment direction relative to the second seat back.

The housing may pivot about an axis that extends in a cross-vehicle direction.

The linear actuator may include a base and an extending portion, the base may have a rotatable threaded shaft, the extending portion may have a threaded hole engaged with the threaded shaft.

With reference to the Figures, an airbag system 20 includes a seat back 22 having a first location 24 and a second location 26 spaced from the first location 24. The airbag system 20 includes a housing 28 pivotally supported by the seat back 22 at the first location 24. The airbag system 20 includes a linear actuator 30 including a first end 32 and a second end 34 opposite the first end 32. The first end 32 is fixed to the seat back 22 at the second location 26. The second end 34 is fixed to the housing 28. The components of the airbag system 20 may be included in a vehicle 36.

The vehicle 36, shown in FIGS. 1-4 may be any passenger or commercial automobile such as a car, a truck, a sport utility vehicle, a crossover vehicle, a van, a minivan, a taxi, a bus, etc. The vehicle 36 may include a passenger cabin 38. The vehicle 36 may include a floor 40. The vehicle 36 may include a first seat 42 and a second seat 44. The first seat 42 and second seat 44 may be located in the passenger cabin 38 and supported by the floor 40. The vehicle 36 defines a cross-vehicle direction CD.

With reference to FIGS. 1-6, each of the seats 42, 44 includes the seat back 22. Each of the seats 42 44 may include a seat bottom 46. Each of the seats 42 44 may include a frame 48. The seat bottom 46 may be supported by the floor 40. The seat back 22 of the second seat 44 is spaced from the seat back 22 of the first seat 42. For example, the first seat 42 may be located within the passenger cabin 38 and in front of the second seat 44.

The seat back 22 may be supported by the seat bottom 46 and is movable, i.e., adjustable, relative to the seat bottom 46. Specifically, the seat bottom 46 and the seat back 22 define a seat angle a, and the seat angle a adjusts as the seat back 22 is adjusted relative to the seat bottom 46. The seat back 22 is adjustable relative to the seat bottom 46 in any suitable way, e.g., a motorized or unmotorized reclining mechanism (not shown). The motorized reclining mechanism, for example, includes a motor that adjusts the seat angle a when a user provides an input.

The seat bottom 46 and seat back 22 may include a cover 50. The cover 50 may include upholstery and padding. The upholstery may be formed of cloth, leather, faux leather, or any other suitable material. The upholstery may be stitched in panels around the frame 48. The padding may be between the cover 50 and the frame 48, and may be foam or any other suitable material. The cover 50 may separate, tear, etc., e.g., upon inflation of an airbag 52.

The frame 48 may include a pair of side beams 54 spaced from each other. The frame 48 may include a crossbar 56 extending between the side beams 54. The crossbar 56 may define the first location 24 on the seat back 22. The frame 48 may include a crossbeam 58 extending between side beams 54. The crossbeam 58 may define the second location 26 on the seat back 22. The second location 26 may be spaced from the first location 24, e.g., the crossbar 56 may be spaced from the crossbeam 58. The crossbar 56 may be disposed above the crossbeam 58. The frame 48 may be formed of any suitable plastic material, e.g., carbon fiber reinforced plastic (CFRP), glass fiber-reinforced semi-finished thermoplastic composite (organosheet), etc. The frame 48 may include other tubes, beams, etc.

With reference to FIGS. 1-9, the housing 28 may be a component of an airbag module 60. The airbag module 60 may include the housing 28, the airbag 52, and an inflator 62.

The airbag 52 may be formed of a woven polymer or any other material. As one example, the airbag 52 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 62 may be, for example, a pyrotechnic inflator that uses a chemical reaction to drive inflation medium to the airbag 52. The inflator 62 may be of any suitable type, for example, a cold-gas inflator.

The airbag 52 may be disposed within the housing 28 in an uninflated position. The inflator 62 is in communication with the airbag 52, e.g., to inflate the airbag 52 to an inflated position.

The housing 28 provides a reaction surface for the airbag 52 in the inflated position. The housing 28 is pivotally supported by the seat back 22 at the first location 24. The housing 28 may be formed of any material, e.g., a rigid polymer, a metal, a composite, etc.

The housing 28 has a first end 64 and a second end 66 opposite the first end 64. The first end 64 of the housing 28 is spaced from the second end 66 of the housing 28. The first end 64 may be above the second end 66.

The first end 64 of the housing 28 may be fixed to the frame 48 at the first location 24. For example, the housing 28 may be pivotally connected to the frame 48 at the first end 64, i.e., in a manner which permits pivotal movement the housing 28 relative to the frame 48. For example, one or more brackets 68 may pivotally fix the housing 28 to the crossbar 56. The brackets 68 may rotate about the crossbar 56. The brackets 68 may be secured to the housing 28 with a fastener, spot weld, etc. Other pivotal couplings may be used to secure the first end 64 of the housing 28 to the frame 48, e.g., a hinge, etc.

The housing 28 may pivot about an axis A that extends is the cross-vehicle direction CD. For example, the crossbar 56 may extend in the cross-vehicle direction CD.

The housing 28 includes a main body 70. The main body 70 may have an extruded rectangular shape. The main body 70 may enclose the airbag 52 and the inflator 62. The main body 70 may include a deployment surface 72. The deployment surface 72 is configured to rupture or otherwise separate to permit the airbag 52 to deploy from the housing 28 upon inflation.

The housing 28 may include a flange 74. The flange 74 may extend from the main body 70. The flange 74 may extend parallel to the deployment surface 72. The flange 74 and the main body 70 may be integral, i.e., formed simultaneously as a one-piece construction. For example, the flange 74 and the main body 70 may be formed with a single piece of sheet metal bent into shape, etc. As an alternative to being integral, the flange 74 and the main body 70 may be formed separately and subsequently joined. For example, the flange 74 and the main body 70 may be formed separately and subsequently joined by fusing, fastening, adhesive, etc.

Figure 8:
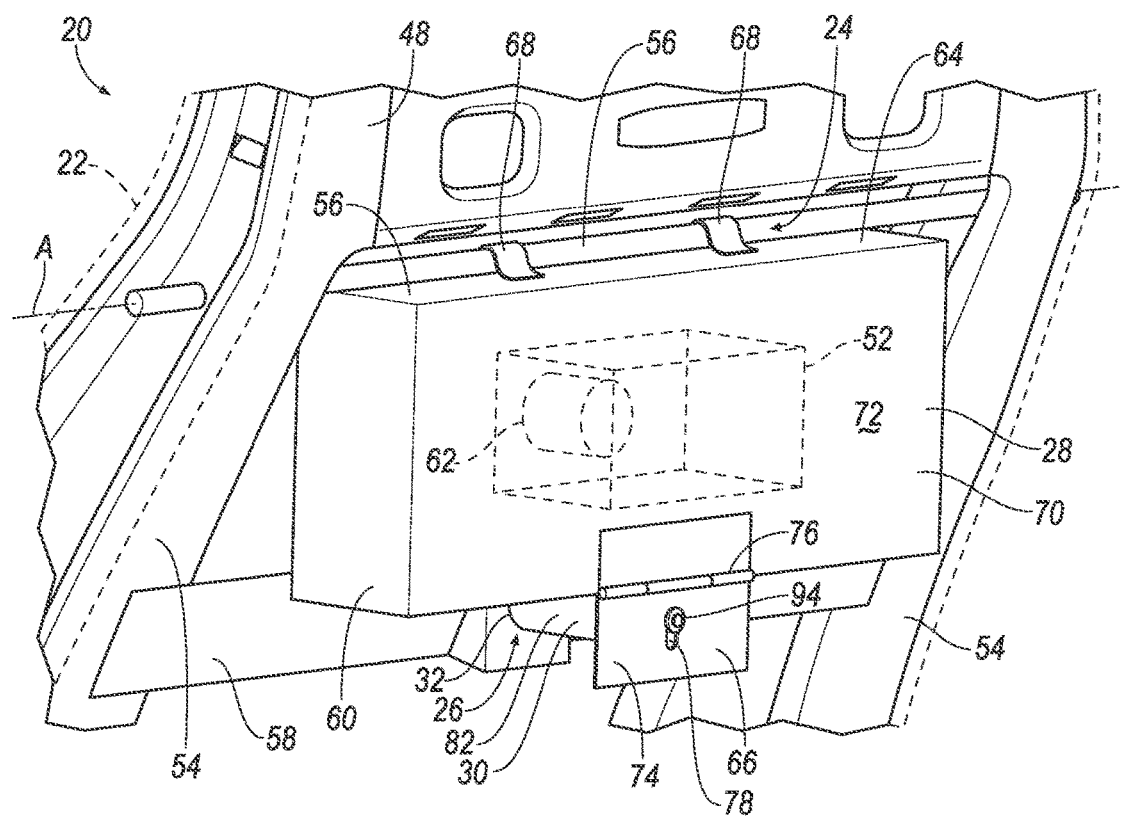
FIG. 8 is a perspective view of another example embodiment the airbag system.

The housing 28 may include a hinge 76, shown in FIG. 8. The hinge 76 may connect the flange 74 to the main body 70. The hinge 76 permits pivotal movement of the flange 74 relative to the main body 70. For example, the hinge 76 may have a first hinge portion fixed relative to the main body 70, a second hinge portion fixed relative to the flange 74, and a pin connecting the first hinge portion and the second hinge portion. The pin may allow pivotal motion of the second hinge portion relative to the first hinge portion. The hinge 76 may be of another design, e.g., a living hinge.

The housing 28 may include a slot 78. The slot 78 may be disposed in the flange 74. The slot 78 may extend away from the main body 70.

Figure 3:
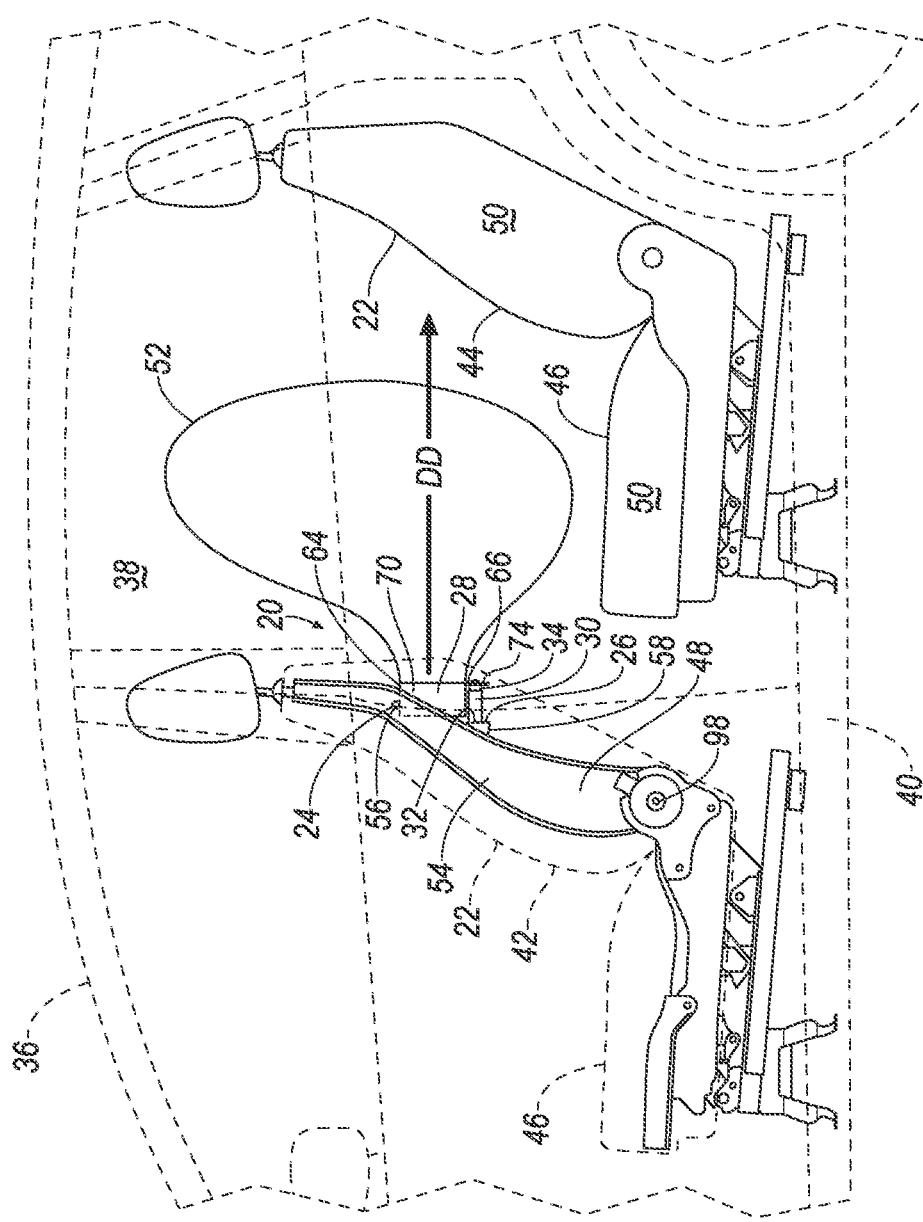
FIG. 3 is a side view of the vehicle including the airbag system with the airbag of the airbag system in an inflated position and at a first deployment direction relative to a seat back.
Figure 4:
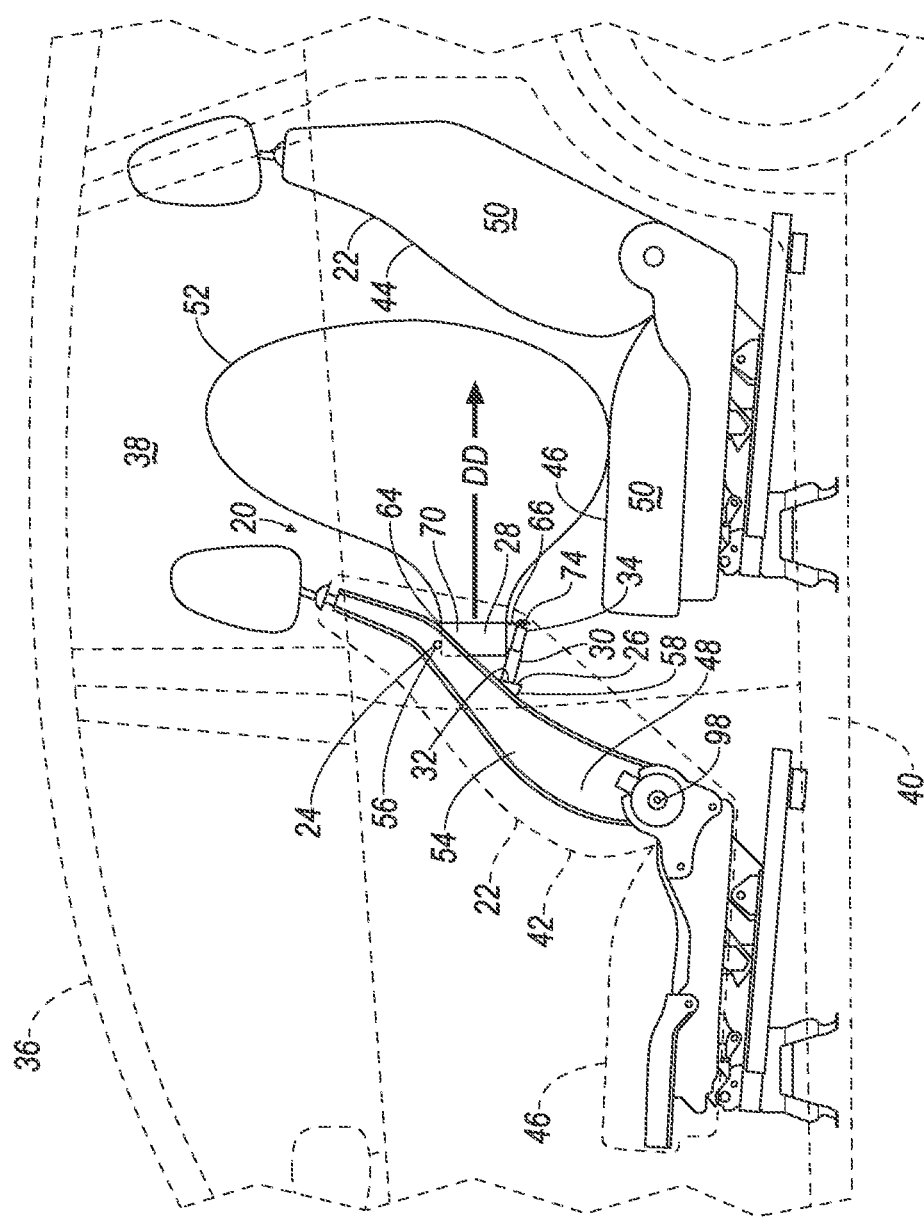
FIG. 4 is a side view of the vehicle including the airbag system with the airbag of the airbag system in the inflated position and at a second deployment direction relative to the seat back.
Figure 7:
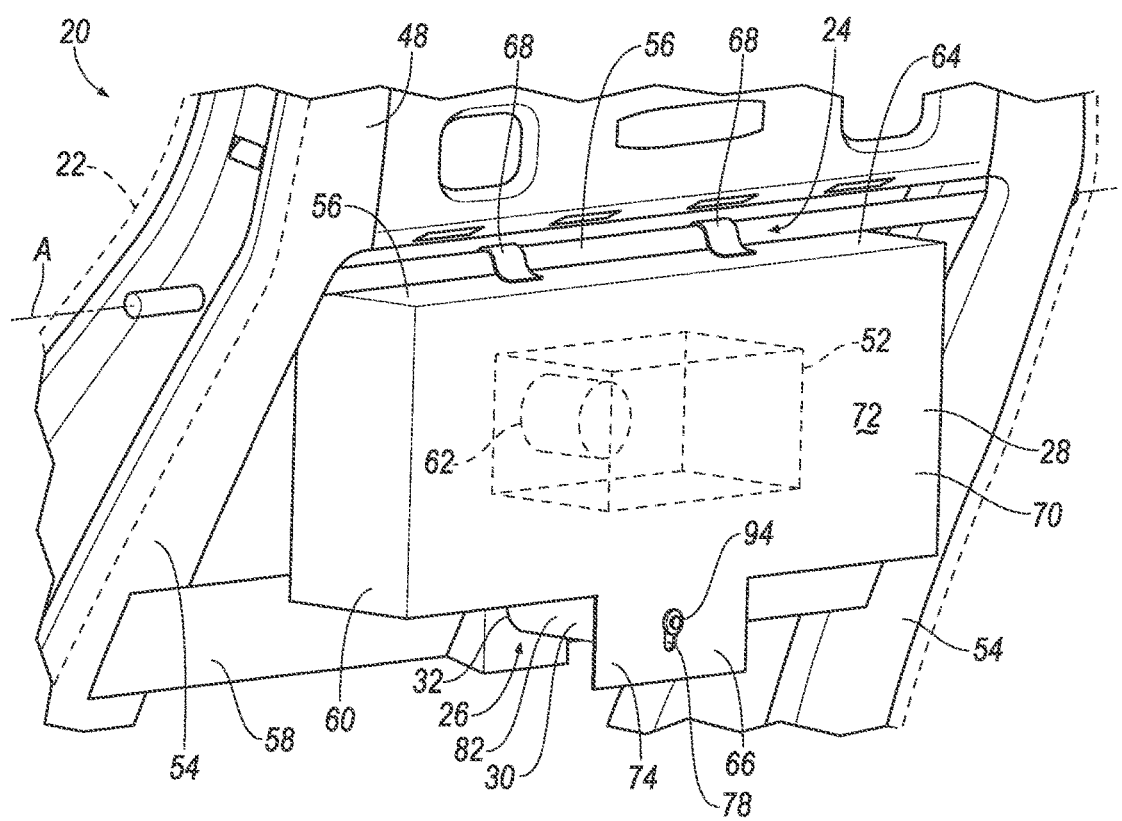
FIG. 7 is perspective view of the airbag system.

The housing 28 defines a deployment direction DD for the airbag 52. The deployment direction DD may be normal to the deployment surface 72. The deployment direction DD may be toward the seat back 22 of the second seat 44. For example, the housing 28 shown in FIG. 3 is at a first rotational position relative to the frame 48 and deploys in one deployment direction DD, e.g., relative to the seat frame 48 and toward the seat back 22 of the second seat 44. The housing 28 shown in FIG. 4 is at a second rotational position relative to the frame 48 and deploys in another deployment direction DD, e.g., relative to the seat frame 48 and toward the seat back 22 of the second seat 44.

Figure 9:
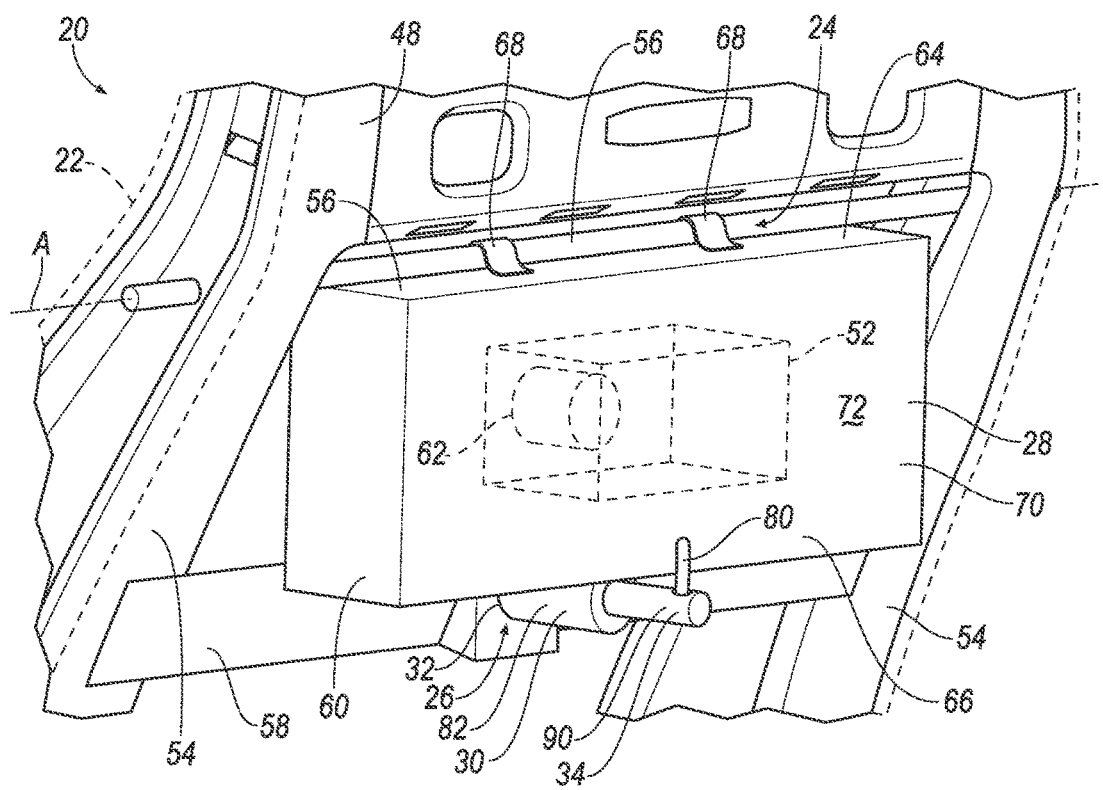
FIG. 9 is a perspective view of another example embodiment the airbag system.

The linear actuator 30 includes the first end 32 and the second end 34 opposite the first end 32. The first end 32 of the linear actuator 30 may be fixed to the seat back 22 at the second location 26. The second end 34 of the linear actuator 30 may be fixed to the housing 28. For example, the second end 34 of the linear actuator 30 may be fixed to the second end 66 of the housing 28. The second end 34 of the linear actuator 30 may be fixed to the flange 74. A cable 80 may connect the second end 34 of the linear actuator 30 and the housing 28, as shown in FIG. 9. The linear actuator 30 may be fixed to the housing 28 and the seat back 22, e.g., the frame 48, with one or more fasteners, spot welds, brackets, etc.

Actuation of the linear actuator 30 varies a distance between the first end 32 of the linear actuator 30 and the second end 34 of the linear actuator 30. For example, actuation of the linear actuator 30 may lengthen the linear actuator 30, thereby increasing the distance between the first end 32 of the linear actuator 30 and the second end 34 of the linear actuator 30. Actuation of the linear actuator 30 may shorten the linear actuator 30, thereby decreasing the distance between the first end 32 of the linear actuator 30 and the second end 34 of the linear actuator 30.

The linear actuator 30 may be self-locking, i.e., the linear actuator 30 may resist a change in length without being actuated. To put it another way, once actuated to a certain length, the linear actuator 30 may maintain such length until a subsequent actuation of the linear actuator 30, e.g., regardless of a force, such as a force generated during deployment of the airbag 52, being applied to the linear actuator 30.

Figure 10:
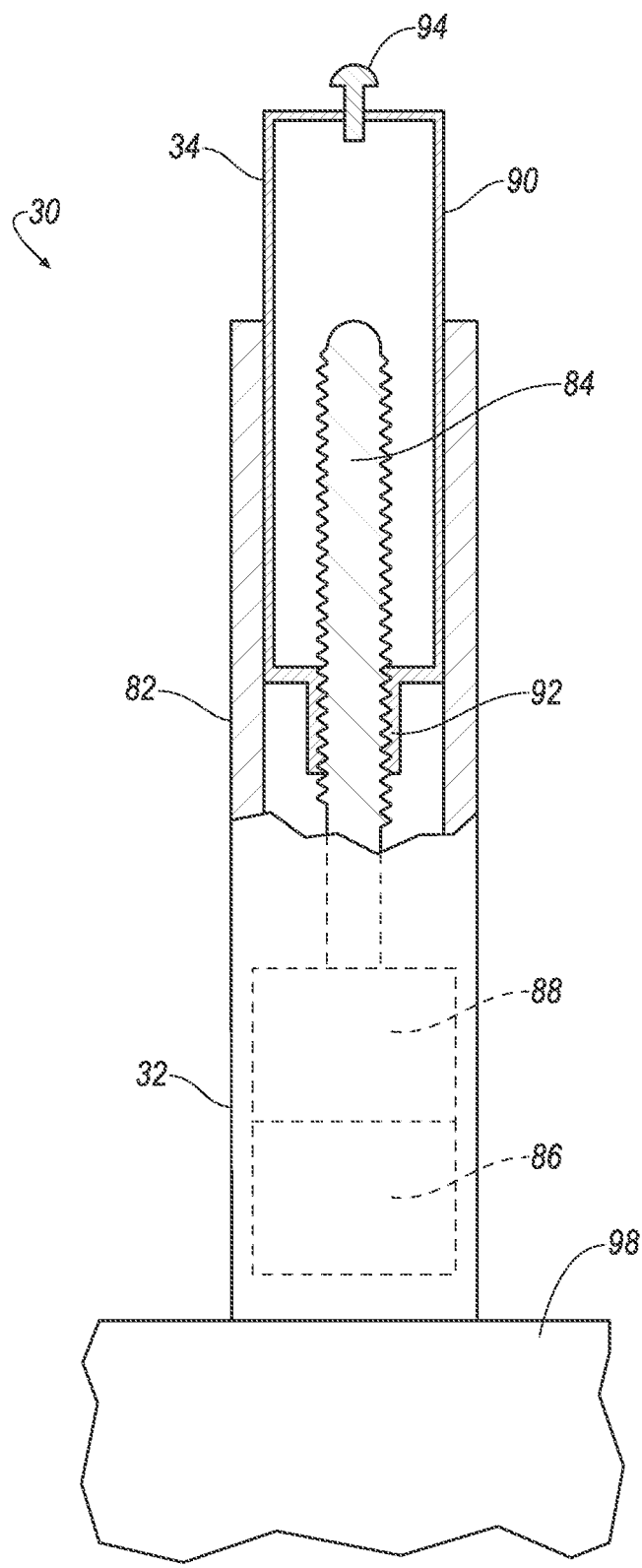
FIG. 10 is a side cutaway view of an example linear actuator of the airbag system.

The linear actuator 30 may include a base 82. The base 82 may have a rotatable threaded shaft 84, as shown in FIG. 10. The base 82 may include a motor 86. The base 82 may include a gear reduction unit 88. The gear reduction unit 88 may be configured to transfer rotational movement of the motor 86 to the threaded shaft 84.

The base 82 may be immovably fixed to the seat back 22. For example, the base 82 may be fixed to the crossbeam 58 to prevent relative translation and rotation therebetween. The base 82 may be immovably fixed to the crossbeam 58 with one or more fasteners, spot welds, etc. Alternatively, the base 82 may be rotatably fixed to the seat back 22 to permit the linear actuator 30 to pivot relative to the seat back 22.

The linear actuator 30 may include an extending portion 90. The extending portion 90 may be slidably received by the base 82. The extending portion 90 may have a threaded hole 92, as shown in FIG. 10. The threaded hole 92 may be engaged with the threaded shaft 84 such that rotation of the threaded shaft 84 relative to the threaded hole 92 causes the extending portion 90 to slide relative to the base 82, i.e., to lengthen or shorten the linear actuator 30.

The linear actuator 30 may be slideably engaged with the slot 78. For example, a bolt 94 may be disposed within the slot 78 and secured to the extending portion 90 at the second end 34 of the linear actuator 30.

As one example, the linear actuator 30 may be disposed beneath the housing 28. Alternatively, the linear actuator 30 may be disposed at any suitable position relative to the housing 28, e.g., behind the housing 28 (i.e., directly in a vehicle-forward position relative to the housing 28), above the housing 28, etc.

The linear actuator 30 is operable to move the housing 28 to change the deployment direction DD of the airbag 52. For example, actuating the linear actuator 30 to change the distance between the first end 32 and the second end 34 of the linear actuator 30 moves the second end 66 of the housing 28 toward, or away from, the frame 48, thereby pivoting the housing 28 at the first end 64 of the housing 28 and changing the deployment direction DD.

The linear actuator 30 is operable to change the deployment direction DD relative to the seat back 22 of the second seat 44. For example, the housing 28 and linear actuator 30 may be supported by the seat back 22 of the first seat 42. The seat back 22 of the second seat 44 may be located behind the seat back 22 of the first seat 42. The housing 28 may be positioned to deploy the airbag 52 rearward from the seat back 22 of the first seat 42, e.g., toward the seat back 22 of the second seat 44. Actuation the linear actuator 30 may move the second end 66 of the housing 28 toward, or away from, the frame 48 of the first seat 42 to pivot the housing 28, as described above. Pivoting the housing 28 may direct the deployment direction DD towards a higher or lower portion of the seat back 22 of the second seat 44.

Figure 11:
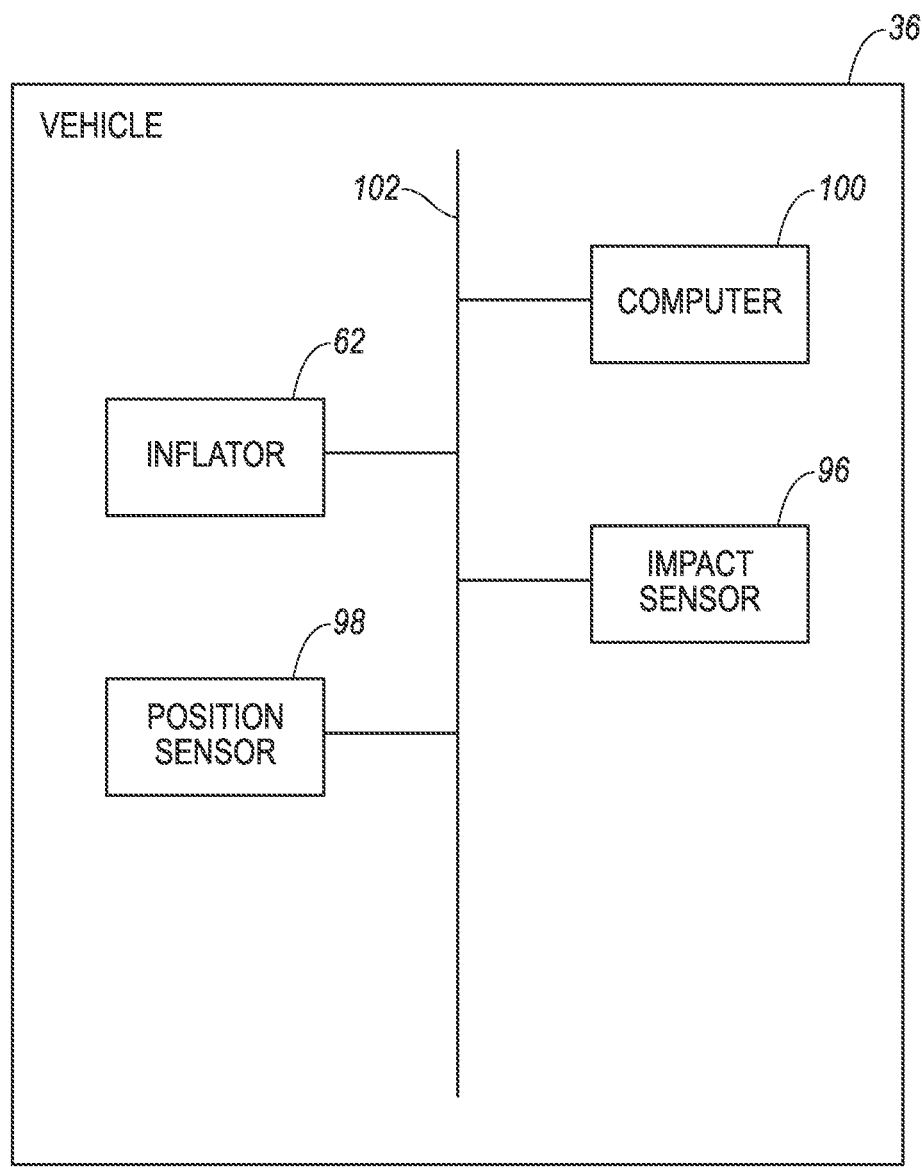
FIG. 11 is a block diagram of components of the vehicle.

With reference to FIG. 11 the vehicle 36 may include at least one impact sensor 96, a position sensor 98, and a computer 100 in communication with the impact sensor 96, the position sensor 98, and the inflator 62.

The impact sensor 96 is configured to detect an impact to the vehicle 36. The impact sensor 96 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 96 may be located at numerous points in or on the vehicle 36.

The position sensor 98 is configured to detect the seat angle a. The position sensor 98 may be of any suitable type, for example, proximity sensors, rotary encoders, etc. The position sensor 98 may be supported by the frame 48. For example, a rotary encoder may detect an angular position of the seat back 42 relative to the seat bottom 46 where the seat back 42 moves relative to the seat bottom 46. For example, a proximity sensor may be supported be the seat bottom 46 and detect a distance to the frame 48 of the seat back 42, where various distances may be associated with various seat angles a, e.g., in a lookup table or the like stored in the computer 100.

The computer 100, the linear actuator 30, the inflator 62, the position sensor 98 and the impact sensor 96 may be connected to a communication network 102, such as a controller area network (CAN) bus, of the vehicle 36. The communication network 102 facilitates communication among vehicle 36 components. The communication network 102 may facilitate wired or wireless communication among the vehicle 36 components in accordance with a number of communication protocols such as controller area network (CAN), Ethernet, WiFi, Local Interconnect Network (LIN), and/or other wired or wireless mechanisms.

The computer 100 may be a microprocessor-based computer 100 implemented via circuits, chips, or other electronic components. For example, the computer 100 may include a processor, a memory, etc. The memory of the computer 100 may include memory for storing programming instructions executable by the processor as well as for electronically storing data and/or databases. Although one computer 100 is shown in FIG. 11 for ease of illustration, it is to be understood that the computer 100 could include, and various operations described herein could be carried out by, one or more computing devices.

The computer 100 may use information from the communication network 102 to control the activation of the inflator 62 and actuation of the linear actuator 30, e.g., based on information from the impact sensor 96 and position sensor 98.

The computer 100 may be programmed to detect the seat angle a. For example, the computer 100 may detect the seat angle a based on information from the position sensor 98. The computer 100 may detect the seat angle a based on information from a seat positioning system (not shown), i.e., an electromechanical system configured to move the first seat 42, including the seat back 22 and seat bottom 46. As another example, the computer 100 may detect the seat angle a based on the reclining mechanism, e.g., the motor of the motorized reclining mechanism. In other words, the computer 100 may be programmed to remember the position of the motor of the motorized reclining mechanism based on instruction provided from the computer 100 to the motor to adjust the seat angle a. As another example, the motor of the motorized reclining mechanism may provide data to the computer 100 indicating the position of the motor, from which the computer 100 determines the seat angle a.

The computer 100 may be programmed to actuate the linear actuator 30 based on the seat angle a. The computer 100 may be programmed to automatically actuate the linear actuator 30 simultaneously or immediately after the seat angle a is adjusted. The computer 100, for example, may store a lookup table or the like associating various seat angles with linear actuator 30 lengths. The lookup table may be populated based empirical testing, e.g., to identify which airbag 52 deployment direction DD provides the greatest protection for an occupant of the second seat 44 at each of the various seat angles a of the first seat 42. The linear actuator 30 may be actuated according to an algorithm, e.g., taking into account a distance between the first end 64 and the second end 66 of the housing 28, the distance between the first end 32 and the second end 34 of the linear actuator 30, the seat angle a, a distance between the first location 24 and the second location 26, etc.

The computer 100 may be programmed to activate the inflator 62 e.g., to provide an impulse to a pyrotechnic charge of the inflator 62 when the impact sensor 96 senses an impact of the vehicle 36. Alternatively or additionally to sensing impact, the computer 100 may be programmed to sense impact prior to impact, i.e., pre-impact sensing. For example, in the event of an impact, the impact sensor 96 may detect the impact and transmit a signal through the communications network to the computer 100. The computer 100 may transmit a signal to the inflator 62. The inflator 62 may discharge and inflate the airbag 52 with an inflatable medium, such as a gas.

The adjectives "first" and "second" are used throughout this document as monikers of convenience and are not intended to signify importance or order.

The phrase "based on" encompasses being partly or entirely based on.

As used herein a computing device, e.g., a computer, includes a processor and a memory. The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data and execute the processes described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instruction executable by the processor to perform the processes described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag system comprising:
   a seat back having a first location and a second location spaced from the first location;
   a housing pivotally supported by the seat back at the first location; and
   a linear actuator including a base and an extending portion slidably received by the base, one of the base and the extending portion including a first end and the other of the base and the extending portion including a second end opposite the first end, the first end fixed to the seat back at the second location, the second end fixed to the housing.

2. The airbag system of claim 1, wherein the housing includes a flange and the second end is fixed to the flange.

3. The airbag system of claim 2, wherein the housing includes a main body and a hinge connecting the flange to the main body.

4. The airbag system of claim 1, wherein the housing includes a slot and the linear actuator is slideably engaged with the slot.

5. The airbag system of claim 1, further comprising a cable connecting the second end of the linear actuator and the housing.

6. The airbag system of claim 1, wherein the housing defines an airbag deployment direction and the linear actuator is operable to move the housing to change the airbag deployment direction.

7. The airbag system of claim 1, wherein the base is immovably fixed to the seat back.

8. The airbag system of claim 1, wherein the linear actuator is self-locking.

9. The airbag system of claim 1, wherein the base has a rotatable threaded shaft, and the extending portion has a threaded hole engaged with the threaded shaft.

10. The airbag system of claim 1, further comprising a computer programmed to detect a seat angle and to actuate the linear actuator based on the seat angle.

11. The airbag system of claim 10, further comprising a seat bottom, wherein the seat bottom and the seat back define the seat angle.

12. The airbag system of claim 1, wherein the seat back includes a frame pivotally supporting the housing and the first end is fixed to the frame.

13. The airbag system of claim 1, wherein the housing has a first end and a second end opposite the first end, the first location is at the first end of the housing, and the second end of the linear actuator is fixed to the second end of the housing.

14. The airbag system of claim 1, further comprising an airbag disposed within the housing and an inflator in communication with the airbag.

15. The airbag system of claim 1, wherein the linear actuator is disposed beneath the housing.

16. A vehicle comprising:
a seat back having a first location and a second location spaced from the first location;
a housing pivotally supported by the seat back at the first location; and
a linear actuator including a first end and a second end opposite the first end, the first end fixed to the seat back at the second location, the second end fixed to the housing;
wherein the linear actuator includes a base and an extending portion, the base having a rotatable threaded shaft, the extending portion having a threaded hole engaged with the threaded shaft.

17. The vehicle of claim 16, further comprising a second seat back spaced from the seat back, wherein the housing defines an airbag deployment direction that is toward the second seat back.

18. The vehicle of claim 16, further comprising a second seat back spaced from the seat back, wherein the linear actuator is operable to change an airbag deployment direction relative to the second seat back.

19. The vehicle of claim 16, wherein the housing pivots about an axis that extends in a cross-vehicle direction.

20. An airbag system comprising:
a seat back having a first location and a second location spaced from the first location;
a housing pivotally supported by the seat back at the first location, the housing including a flange, a main body and a hinge connecting the flange to the main body; and
a linear actuator including a first end and a second end opposite the first end, the first end fixed to the seat back at the second location, the second end fixed to the flange of the housing.

* * * * *